United States Patent [19]
Wilkinson

[11] Patent Number: 4,663,699
[45] Date of Patent: May 5, 1987

[54] SYNCHRONOUS CONVERTER CIRCUIT

[75] Inventor: Bruce L. Wilkinson, Torrance, Calif.

[73] Assignee: Pioneer Magnetics, Inc., Santa Monica, Calif.

[21] Appl. No.: 722,380

[22] Filed: Apr. 12, 1985

[51] Int. Cl.[4] .......................................... H02M 3/335
[52] U.S. Cl. ........................................ 363/17; 363/98
[58] Field of Search ................................. 363/15–17, 363/39–41, 71–72, 86, 97–98, 131–132

[56] References Cited

U.S. PATENT DOCUMENTS

| | | | |
|---|---|---|---|
| 4,063,306 | 12/1977 | Perkins et al. | 363/98 X |
| 4,301,498 | 11/1981 | Farrer | 363/17 |
| 4,399,499 | 8/1983 | Butcher et al. | 363/17 |

OTHER PUBLICATIONS

E. A. Dobberstein, "Very High Frequency FM-Regulated Power Supply with Enhanced Output Power Capability", IBM Tech. Discl. Bulletin, vol. 27, No. 9, Feb. 1985.

*Primary Examiner*—Peter S. Wong
*Attorney, Agent, or Firm*—Keith D. Beecher

[57] ABSTRACT

A high power factor, regulated synchronous converter for converting 110-volt, rectified, 50–60 Hz alternating current into a direct current output, which has enhanced hold up (energy storage). The circuit includes a half-bridge inverter for converting the half-wave rectified voltage into high frequency alternating current in the range of 20–30 KHz. The high frequency alternating current is coupled through an inductance coil to a half-bridge synchronous regulator/rectifier which produces a direct current output. The energy delivered to the half-bridge synchronous regulator/rectifier is stored in a capacitor, and the voltage across the capacitor may be regulated making energy storage independent of the line voltage. Additional synchronous regulator/rectifiers may be coupled to the circuit to produce additional direct current outputs.

6 Claims, 2 Drawing Figures

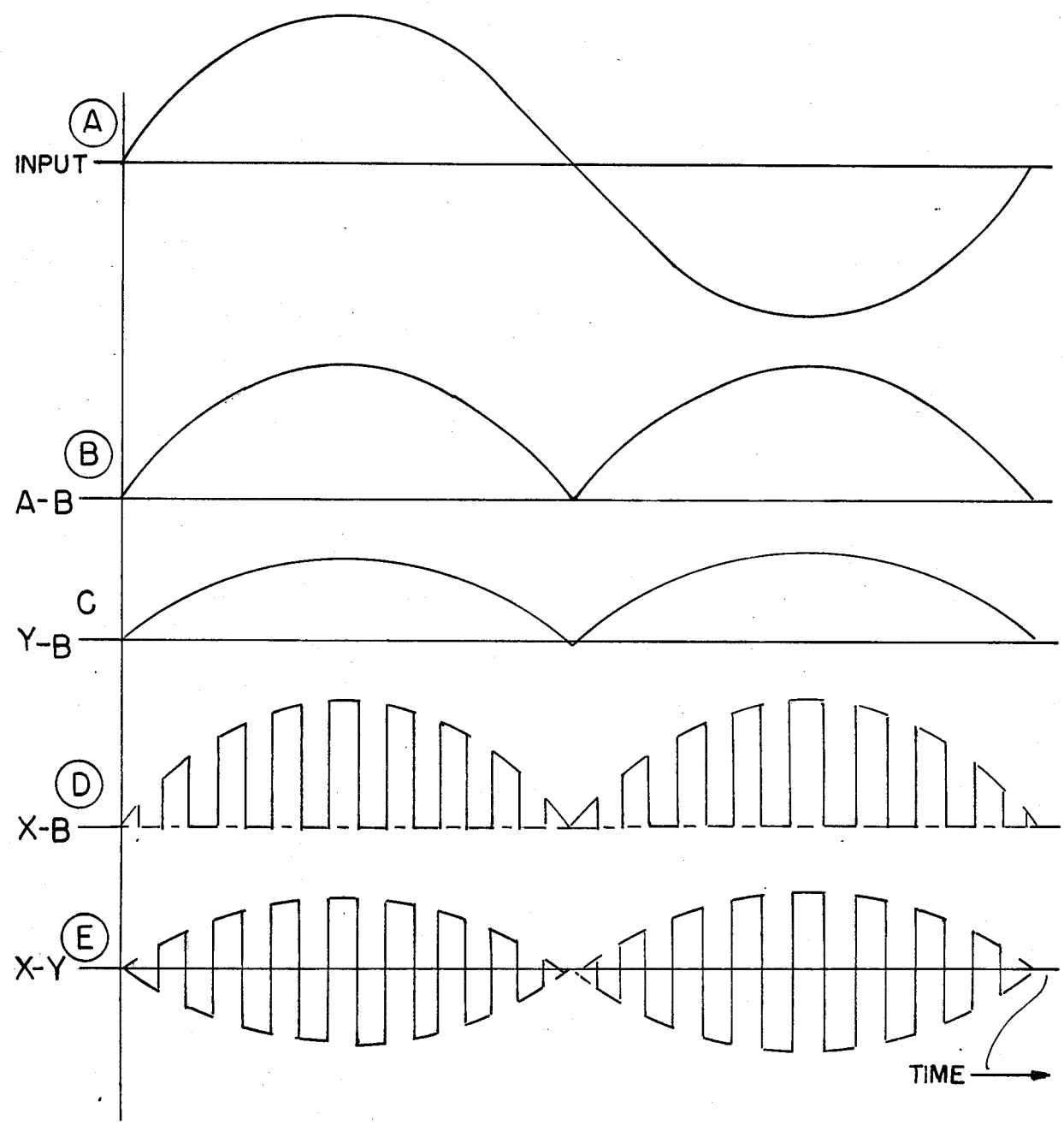

ns and large
SYNCHRONOUS CONVERTER CIRCUIT

BACKGROUND OF THE INVENTION

Power supplies for electronic devices are divided into two general types. In one type, known as a linear power supply, the line alternating current is transformed to an appropriate voltage, rectified and filtered by capacitors and inductance coils. A linear regulator may then be provided in the output circuit to maintain a constant output voltage. Although this type of power supply is widely used, it requires heavy transformers and large capacitors, and it has a relatively low power transform efficiency.

In a second type of conventional power supply, known as a switched power supply, the line alternating current is rectified and filtered and supplied to an inverter circuit. The inverter switches the filtered signal on and off at a high rate to generate a high frequency squarewave. An output transformer then converts the squarewave to the desired voltage level, and the resulting current is passed through a rectifying network and filters to produce a direct current output.

This latter type of power supply uses lighter components and has a relatively high transform efficiency. The present invention provides an improved power supply of the second type in the form of a synchronous converter, which is relatively simple in its construction and which exhibits a high power factor and enhanced hold-up.

BRIEF DESCRIPTION OF THE DRAWINGS

FIG. 2 is a series of curves useful in explaining the operation of the circuit of FIG. 1.

DETAILED DESCRIPTION OF THE ILLUSTRATED EMBODIMENT

Figure 1:
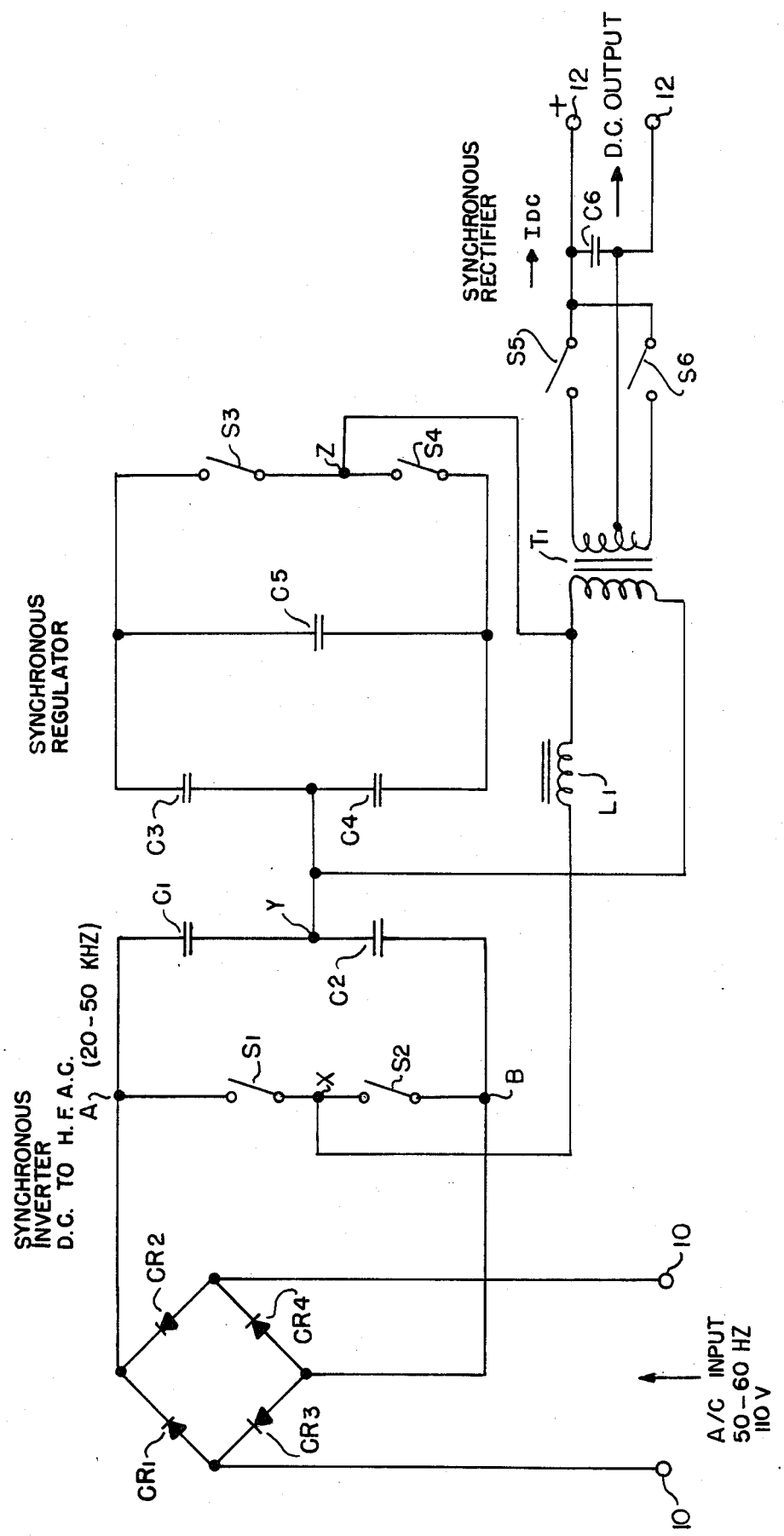
FIG. 1 is a circuit diagram of a synchronous converter circuit constructed in accordance with one embodiment of the invention.

The circuit of FIG. 1 includes four diodes CR1, CR2, CR3 and CR4 which are connected as a bridge rectifier network connected to input terminals 10 which, in turn, are connected to an appropriate source of alternating current line voltage of the order of 110 volts, and having a frequency of 50-60 Hz. The bridge rectifier is connected to a pair of switches S1 and S2 which, for example, may take the form of field effect transistors (FET's). Capacitors C1 and C2 are connected across the the switches S1 and S2.

The switches S1 and S2 and the capacitors C1 and C2 form a half-bridge inverter, the switches S1 and S2 being driven alternately at a high rate so that the half-wave rectified voltage from the rectifier is converted into a high frequency voltage in a range, for example, of 20-50 KHz.

A synchronous regulator/rectifier comprising capacitors C3 and C4, and switches S3 and S4, together with a main storage capacitor C5 is provided. The common junction of capacitors C1 and C2 of the inverter is connected to the common junction of capacitors C3 and C4. The common junction of switches S1 and S2 is connected through an inductance coil L1 to the common junction of switches S3 and S4.

Switches S3 and S4 may take the form of FET's, and they are driven in synchronism with the switches S1 and S2, but at a varying phase relationship therewith so as to achieve the desired regulating function of the regulator/rectifier.

The inductance coil L1 is also connected to one side of a transformer T1 which is included in a synchronous rectifier, formed by switches S5 and S6, and a capacitor C6, which are connected to the secondary winding of transformer T1 as shown. Switches S5 and S6 may also be FET's, and they also are driven in synchronism with switches S1, S2 and S3, S4, but not necessarily in phase with the operation of switches S1 and S2.

The switches S1 and S2, and capacitors C1 and C2 form a half-bridge inverter, as stated above. Capacitors C1 and C2 are too small to filter the ripple resulting from the rectification of the line voltage by the bridge network CR1, CR2, CR3 and CR4. However, capacitors C1 and C2 provide a low impedance path for high frequency currents in the range, for example, of 20-30 KHz. The high frequency alternating current produced by the inverter is coupled through the inductance coil L1 to a half-bridge circuit which forms the synchronous regulator/rectifier, and which is composed of switches S3 and S4, and of capacitors C3 and C4.

The junction point of the rectifying bridge network CR1-CR4 and switch S1 is designated A, the junction point of the rectifying bridge network CR1-CR4 and switch S2 is designated B, the common junction point of switches S1 and S2 is designated X, the common junction point of capacitors C1, C2 and C3, C4 is designated Y, and the common junction point of switches S3 and S4 is designated Z.

The input across the input terminals 10 is represented by the curve A in FIG. 2, and the rectified output voltage produced by the bridge network CR1-CR4, and which appears across points A and B, is represented by curve B in FIG. 2. The voltage across the points B and Y is similar to the voltage across the points A and B, but has a reduced amplitude, as shown in the curve C of FIG. 2. The voltage across the points X and B is a chopped high frequency squarewave modulated by the half-wave rectified current from the rectifier bridge, as shown in curve D of FIG. 2; and the voltage appearing across the points X and Y is similar to the voltage shown at curve D, but disposed on an alternating current axis, as shown by curve E.

The energy delivered to the half-bridge regulator/rectifier formed by switches S3 and S4, and capacitors C3 and C4 from the half-bridge inverter formed by the switches S1 and S2, and capacitors C1 and C2, is stored in capacitor C5. By programming the phase relationship between the switches S1, S2 and S3, S4, the current drawn from the 50-60 Hz alternating current line may approximate a sine wave, resulting in high power factor. Also, the voltage across capacitor C5 may be regulated making the energy storage independent of source voltage. The switches S3 and S4 supply voltage to capacitor C5 when the input voltage is high and draw energy out of capacitor C5 when the input voltage is low, so as to smooth out the voltage across the capacitor.

The initial surge current may be limited to any desired value. Because switches S3 and S4 also act as an inverter, a squarewave at high frequencies is produced which may be used to drive other similar regulator/rectifiers, such as the synchronous regulator/rectifier formed by switches S5, S6 and capacitor C6, to produce direct current regulated outputs.

The capacitor C6 in the synchronous regulator/rectifier is relatively large so that the voltage ripple is small compared with the direct current output voltage across the output terminals 12. Switches S1 and S2 are switched alternately at the same frequency as switches S1 and S2, as stated above, but not necessarily of the same phase as the alternating current input.

Because S3 and S4 also act as an inverter, a squarewave at high frequencies is produced which may be used to drive similar regulator/rectifiers to produce regulated outputs. This squarewave accordingly is applied across the primary of transformer T1 with a peak value equal to the direct current output appearing across output terminals 12. Transformer T1 is a high leakage reactance transformer to enable the synchronous regulator/rectifier S5, S6 to perform the desired regulating functions.

In the circuit of FIG. 1, the alternating current source is a synchronous inverter from a direct current source, and the system is capable of operating as a bi-directional direct current-direct current converter. The inclusion of the series inductance L in the alternating current loop provides the impedance required to support the difference in voltage between the input (S1–S2) and the output (S3–S4) switches. Since this impedance is an inductance it illustrates that the system to work efficiently with large amounts of transformer leakage inductance. This is important in systems requiring a high level of isolation between primary and secondary. In the circuit of FIG. 1, the required inductance for the synchronous switches (S5–S6) is provided by the leakage inductance of T1.

Multiple regulator/rectifiers S5, S6 may be provided to produce multiple outputs. Also, because of the bi-directional nature of the synchronous regulator/rectifiers, power fed to one of the outputs may be utilized to supply the other outputs, which is useful in powering class B amplifiers driving reactive loads, and in battery back-up systems.

The invention provides, therefore, a synchronous converter which is relatively simple in its construction, and which operates efficiently in a bi-directional manner to drive multiple output regulated synchronous rectifier circuits from a single synchronous inverter. The circuit exhibits a high power factor, and enhanced hold-up (energy storage).

It will be appreciated that while a particular embodiment of the invention has been shown and described, modifications may be made. It is intended in the claims to cover all modifications which come within the spirit and scope of the invention.

I claim:

1. A synchronous converter circuit including: an input circuit adapted to be connected to the alternating current mains for rectifying the low frequency alternating current therefrom; an inverter circuit coupled to the input circuit to invert the rectified voltage therefrom into a high frequency current; said inverter circuit including first and second switches alternately operated at a rate corresponding to the frequency of the high frequency current; and a synchronous regulator circuit coupled to the inverter circuit and including first and second switches operated in synchronism with the first and second switches of the inverter circuit but at a varying phase relationship therewith to cause the regulator to generate a constant amplitude squarewave signal having a frequency corresponding to the frequency of the high frequency current from the inverter, said first and second switches of said synchronous converter circuit being series connected across the input circuit, and said synchronous converter circuit including first and second capacitors series connected across said switches having a capacity too small to filter out the ripple resulting from the half-wave rectification of the line voltage by said input circuit but providing a low impedance path for the high frequency currents from said synchronous converter circuit; and said synchronous regulator including first and second capacitors series connected across said first and second switches of said synchronous regulator circuit and whose common junction is connected to the common junction of the first and second capacitors of the synchronous inverter, and which includes a storage capacitor connected across the first and second capacitors of said synchronous regulator across which a constant amplitude high frequency voltage occurs having a frequency corresponding to the frequency of the high frequency current from the synchronous inverter.

2. The synchronous converter circuit defined in claim 1, in which said synchronous regulator includes a storage capacitor across which the constant amplitude voltage appears.

3. The synchronous converter circuit defined in claim 1, and which includes a synchronous rectifier circuit coupled to the synchronous regulator circuit and forming a regulated direct current output in response to the constant amplitude squarewave from the regulator circuit.

4. The synchronous converter circuit defined in claim 3, in which said synchronous rectifier includes first and second switches operated in synchronism with the first and second switches of the synchronous inverter circuit but at a varying phase relationship with respect thereto to regulate the direct current voltage appearing at the output of the rectifier.

5. The synchronous converter circuit defined in claim 3, in which said synchronous rectifier includes a transformer having a high leakage reactance.

6. The synchronous converter circuit defined in claim 1, in which said synchronous inverter is coupled to said synchronous regulator through an inductance coil.

* * * * *